Nov. 28, 1967  E. E. DRABEN  3,354,508
CHARGING FITTING FOR PLASTIC MOLDING APPARATUS
Filed July 9, 1965

ELMER E. DRABEN
INVENTOR.
BY
ATTORNEY 3,354,508
CHARGING FITTING FOR PLASTIC MOLDING APPARATUS
Elmer E. Draben, Glendora, Calif., assignor to Hoedra, Inc., Monrovia, Calif., a corporation of California
Filed July 9, 1965, Ser. No. 470,790
5 Claims. (Cl. 18—30)

This invention relates to plastic molding apparatus and more particularly to a simple easily operated reuseable charging fitting for use between the mold proper and the plastic charging nozzle and including valve means for automatically closing the charging opening to retain the charge captive until it takes a set.

Various expedients have been resorted to heretofore in attempts to retain an uncured plastic charge against escape from the mold after being charged thereinto. It not infrequently occurs that after the initial charge is injected it is found that the charge is incomplete owing to various causes such as the presence of trapped air, inadequate charging, the escape of a portion of the charge, and the like. To correct this condition it is necessary to augment the initial charge one or more times. The devices heretofore provided intended to prevent loss of portions of the charge and the production of an incomplete and defective molding are quite unsatisfactory and leave much to be desired from the standpoint of convenience of use, simplicity, cost and effectiveness.

It is an object of the present invention to provide a simple, inexpensive rugged charging fitting avoiding the shortcomings of prior art practices. To this end the invention fitting preferably includes connector means for holding it detachably but positively connected to the mold parts during charging of the mold and curing of the charge. This fitting includes a normally closed valve member designed to be opened automatically by insertion of the charging nozzle and to close immediately and as an incident to the withdrawal of the charging nozzle thereby preventing escape of any part of the charge. After the charge has taken a set the fitting is easily removed and separated from the portion of the charge occupying the fitting.

Accordingly it is a primary object of the present invention to provide a simple, inexpensive, reuseable charging fitting for use with molding equipment for elastomeric plastic compounds.

Another object of the invention is the provision of an improved charging fitting for use with molds used to mold plastic parts and featuring a simple normally closed valve designed to be opened as the charge is injected into the mold and to close automatically upon withdrawal of the charging nozzle from the fitting.

Another object of the invention is the provision of a charging fitting for plastic molding equipment and featuring a simple valve readily replaced with a new one whenever the one in use becomes unserviceable.

These and other more specific objects will appear upon reading the following specification and claims and upon considering in connection therewith the attached drawings to which they relate.

Referring now to the drawings in which a preferred embodiment of the invention is illustrated.

Figure 1:
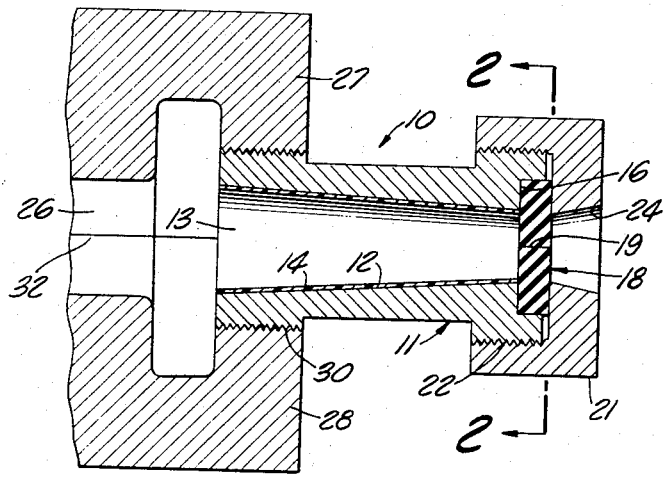
FIGURE 1 is a cross-sectional view through the invention charging fitting installed in a mold in readiness to receive the plastic charge.
Figure 2:
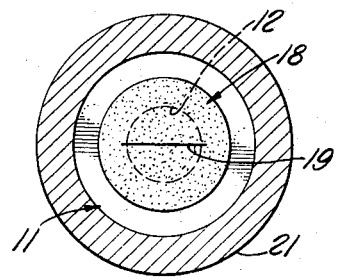
FIGURE 2 is a cross-sectional view taken along line 2—2 on FIGURE 1 showing details of the automatic valve.
Figure 3:
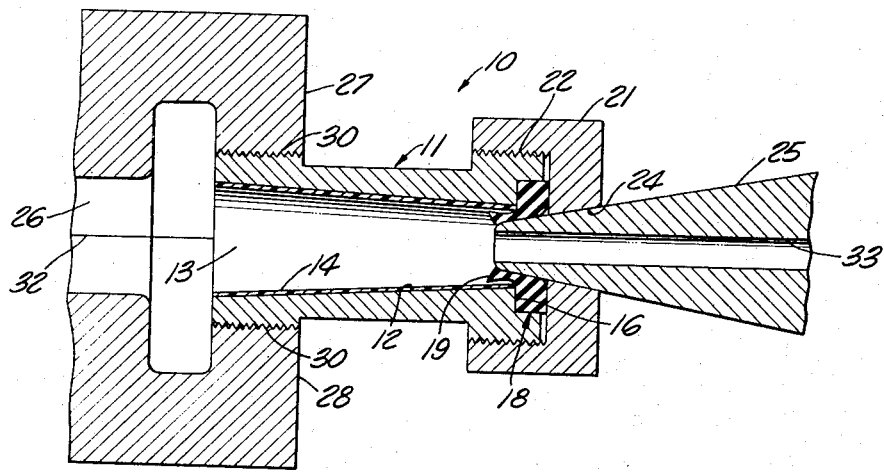
FIGURE 3 is a view similar to FIGURE 1 and showing the charging nozzle in position to inject the plastic charge into the mold.

Referring now to FIGURES 1 to 3 there is shown a preferred embodiment of an improved charging fitting designated generally 10. This fitting has an elongated tubular main body 11 provided with a through passage 12 which diverges toward the outlet end 13. This passage is preferably highly polished or coated with material such as tetrafluoroethylene polymer having a very low coefficient of friction and therefore easily separated from the material charged into the mold after the latter has taken a set.

The outer end of main body 11 is provided with a shoulder 16 on which is seated a valve disc 18 of flexible resilient elastomeric material as rubber or a suitable flexible plastic. This valve disc is provided with one or more slits 19 extending diametrically thereof and normally closed in the position shown in FIGURES 1 and 2.

Valve 18 is held seated in high pressure contact with shoulder 16 as by a bushing 21 threaded to the outer end 22 of the main body. This bushing preferably has a tapered passage 24 in axial alignment with passage 12 and serving as a pilot or guide for the charging nozzle 25 used in injecting the charge into the cavity 26 of the molding equipment 27, 28. As hereinshown, the taper angle of passage 24 corresponds generally with the exterior taper of nozzle 25 with the result that the latter fits snugly in passage 24 when properly inserted. It will be understood that tapered passage 24 also limits insertion of the nozzle so as not to damage valve disc 18.

The discharge end of fitting 10 is preferably threaded at 30 or provided with other suitable means for holding the fitting snugly but separately mounted in the charging opening between mold parts 27, 28.

In the use of fitting 10, the two halves 27, 28 of the molding apparatus are closed against one another along parting line 32, care first being taken to have cavity 26 thoroughly clean and in readiness to receive the charge. Fitting 10 is then screwed into the charge receiving opening. Thereafter charging nozzle 25 is guided into tapered passage 24 of bushing 21. As it enters the advance end of the nozzle presses against the valve disc forcing the material to either side of slit 19 to hinge inwardly into high pressure contact with the adjacent surfaces of nozzle 25. When the nozzle is fully inserted it seats against surface 24 of the bushing and against the resilient valve disc.

The uncured plastic compound is then injected under pressure through passage 33 of the nozzle and into cavity 26 until the latter is completely filled including passage 12 of the charging fitting. Once it is determined that the cavity is properly filled the operator may withdraw the charging nozzle allowing the lips of the valve disc to resume their normal closed position as shown in FIGURE 1.

The charged mold is then subjected to curing in the usual way employing heat of the requisite temperatures to cure the charge constituents. Thereafter fitting 10 may be detached by unthreading it from threads 30, or the mold parts may be separated from one another following which fitting 10 is withdrawn axially from the portion of the charge filling passage 12. This part of the casting can then be cut away or removed in any customary manner. Thereafter fitting 10 may be then reassembled to the mold and reused in the manner described above. After repeated use valve disc 18 may not close perfectly. In this event the disc is easily replaced with a new one by removing and reassembling bushing 21 along with a new valve member.

While the particular charging fitting for plastic molding apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:
1. A charging fitting for use with plastic molding equipment to retain the mold charge captive until the same takes a set, said charging fitting comprising a main body having a long flaring passage and formed at the larger discharge end thereof with means for holding the same detachably assembled to the charging opening of a mold assembly, normally-closed flexible valve means mounted across the outer inlet end of said passage and adapted to be held open by the discharge end of means for charging uncured fluent plastic into the mold assembly, said normally closed valve operating automatically to close as said charging means is withdrawn and being effective to hold the charge captive while taking a set.

2. A charging fitting as defined in claim 1 characterized in that said mounting means comprises a bushing having a threaded connection with the inlet end of the passage through said main body, and said bushing having an outwardly diverging passage axially aligned with said long flaring passage to seat and limit the insertion of said plastic charging means.

3. A charging fitting as defined in claim 1 characterized in that said long flaring passage is provided with a smooth surfaced coating which does not adhere to the plastic charge as the latter takes a set.

4. A charging fitting as defined in claim 3 characterized in that said coating is formed essentially of tetrafluoroethylene.

5. A charging fitting as defined in claim 1 characterized in that said normally closed valve means comprises a thick disc of nonmetallic resilient material formed with a slit diametrically thereof and adapted to be pressed open as the plastic charging means is pressed inwardly therethrough.

References Cited

UNITED STATES PATENTS

| | | | |
|---|---|---|---|
| 1,974,663 | 9/1934 | May | 18—30 |
| 2,700,178 | 1/1955 | Blake | 18—30 |
| 2,756,479 | 7/1956 | Garneau | 18—30 X |
| 3,095,609 | 2/1963 | Lievre | 18—30 |
| 3,109,200 | 11/1963 | Lugwig | 18—3 |
| 3,313,875 | 4/1967 | Magerle | 18—30 |

WILLIAM J. STEPHENSON, *Primary Examiner.*